United States Patent
Jonas et al.

(10) Patent No.: US 7,644,068 B2
(45) Date of Patent: Jan. 5, 2010

(54) SELECTING RECORDS FROM A LIST WITH PRIVACY PROTECTIONS

(75) Inventors: Jeffrey James Jonas, Las Vegas, NV (US); David Charles Martin, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 11/539,260

(22) Filed: Oct. 6, 2006

(65) Prior Publication Data

US 2008/0086452 A1    Apr. 10, 2008

(51) Int. Cl.
*G06F 17/30* (2006.01)
(52) U.S. Cl. .................. 707/3; 707/4; 707/5; 707/9; 726/31
(58) Field of Classification Search .................. 707/3, 707/4, 5, 9
See application file for complete search history.

(56) References Cited

U.S. PATENT DOCUMENTS

| | | | |
|---|---|---|---|
| 5,924,090 A | 7/1999 | Krellenstein | 707/5 |
| 5,974,389 A * | 10/1999 | Clark et al. | 705/3 |
| 6,321,224 B1 * | 11/2001 | Beall et al. | 707/5 |
| 6,633,885 B1 * | 10/2003 | Agrawal et al. | 707/102 |
| 7,035,849 B2 | 4/2006 | Tifft | 707/5 |
| 7,340,451 B2 * | 3/2008 | Sacco | 707/3 |
| 2002/0052894 A1 * | 5/2002 | Bourdoncle et al. | 707/513 |
| 2003/0130867 A1 * | 7/2003 | Coelho et al. | 705/2 |
| 2005/0210007 A1 * | 9/2005 | Beres et al. | 707/3 |
| 2005/0234890 A1 | 10/2005 | Enzler et al. | 707/3 |
| 2005/0273452 A1 | 12/2005 | Molloy et al. | 707/1 |
| 2006/0015362 A1 | 1/2006 | Nakase et al. | 705/1 |
| 2006/0026128 A1 | 2/2006 | Bier | 707/3 |
| 2006/0074875 A1 | 4/2006 | Faunce et al. | 707/3 |
| 2006/0080283 A1 | 4/2006 | Shipman | 707/3 |

(Continued)

FOREIGN PATENT DOCUMENTS

WO    WO 01/50400    7/2001

(Continued)

OTHER PUBLICATIONS

Kalus, C.; Dadam, P.; "Record Sub-typing in Flexible Relations by Means of Attribute Dependencies," IEEE 1063-6382, pp. 383-390, 1995.

(Continued)

*Primary Examiner*—Tim T. Vo
*Assistant Examiner*—Gary J Koo
(74) *Attorney, Agent, or Firm*—VanLeeuwen & VanLeeuwen; Erin C. Ming

(57) ABSTRACT

A user wishes to view a record, such as one that includes a person's medical history, located in a record storage area. In order to prevent the user from viewing records other than the specific record in which the user is interested, a record selection manager iteratively requests attribute information from the user to disambiguate which record to provide until the record selection manager identifies a reduction completion result, which the record selection manager then provides to the user. Using the invention described herein, the record selection manager conceals records included in the records storage area until it identifies a reduction completion result and, at that point, the record selection manager provides only the reduction completion result to the user to view.

30 Claims, 7 Drawing Sheets

U.S. PATENT DOCUMENTS

2006/0085391 A1* 4/2006 Turski et al. ............... 707/3
2006/0085470 A1  4/2006 Schmitt et al. ............ 707/102
2006/0106847 A1  5/2006 Eckardt, III et al. ....... 707/101

FOREIGN PATENT DOCUMENTS

WO    WO 2006/104810    10/2006

OTHER PUBLICATIONS

Minton et al;"A Heterogeneous Field Matching Method for Record Linkage," IEEE International Conference on Data Mining, 1550-4786/05, 2005.

International Search Report for PCT application PCT/EP2007/060593, filed Oct. 10, 2005, search report mailed Jan. 14, 2009, 10 pages.

* cited by examiner

|  | 205 | 210 | 215 | 220 | 225 | 230 | 235 | 240 |
|---|---|---|---|---|---|---|---|---|
|  | Name | Street Address | City | State | ZIP | DOB | SSN | Ded. |
| 250 | Bill Smith | 123 Common St. | Walla Walla | WA | 45821 | 4/1/65 | 123-45-8956 | $350 |
| 255 | Pat Smith | 435 Main St. | Plainview | VT | 12543 | 3/8/78 | 654-63-4528 | $3,000 |
| 260 | Pat Smith | 9685 Cole St. | Warsaw | VT | 24517 | 7/16/62 | 684-52-3975 | $450 |
| 265 | Pat Smith | 564 Stafford Ln. | Austin | TX | 78687 | 5/12/40 | 325-65-7878 | $700 |
| 270 | Tom Smith | 4242 Cape Cod Ln. | Tulsa | OK | 65754 | 12/12/55 | 141-47-9631 | $1,000 |

*FIG. 2*

SELECTING RECORDS FROM A LIST WITH PRIVACY PROTECTIONS

BACKGROUND OF THE INVENTION

1. Technical Field

The present invention relates to a system and method for selecting records from a list using privacy protection. More particularly, the present invention relates to a system and method for selecting and providing a reduction completion result to a user without exposing other records during the selection process.

2. Description of the Related Art

Many users perform record retrievals on a routine basis, such as retrieving a patient's medical history. These users may search their own databases or use a third party to locate a particular record. When searching for a particular record, a user typically provides a certain number of attributes in order to adequately search a database, such as a name or address. When the search returns multiple records, existing art allows the user to view each of the records in order for the user to select the correct record. For example, if a user wished to retrieve medical history for "Pat Smith," the search result may return ten records, each corresponding to a different Pat Smith. In this example, the user may view information in each of the records in an effort to identify the correct "Pat Smith" record.

A challenge found with this approach, however, is that the user is privy to information included in each retrieved record in addition to the record that user wishes to actually retrieve. As a result, the user may view a person's personal information included in the records that the user has no reason to view.

What is needed, therefore, is a system and method that provides record privacy protection during a record query.

SUMMARY

It has been discovered that the aforementioned challenges are resolved using a system, method, and computer program product for providing a reduction completion result to a user without exposing other records during the selection process. To provide the reduction completion result, a subset of records is identified from a group of records using an initial user provided attribute supplied by a user. Each of the subset of records includes a record attribute value that matches the initial user provided attribute. In order to refine the subset of records, the system, method, and program product sends a subset discriminating request to the user, which requests further attribute information. As a result, the system, method, and program product receives a subsequent user provided attribute from the user that is used to reduce the subset of records to a reduction completion result. In turn, the system, method, and program product provides the reduction completion result to the user.

In one embodiment, the system, method, and program product includes only one record, which is an explicit matched record, in the reduction completion result. In another embodiment, the system, method, and program product includes an irreducible record set as the reduction completion result. The irreducible record set is a reduced subset of records that is no longer reducible using additional subsequent user provided attributes.

In another embodiment, the system, method, and program product conceals, from the user, each of the subset of records during the process of selecting the reduction completion result. In one embodiment, the system, method, and program product computes conjoint probabilities among record attributes using corresponding record attribute values. In this embodiment, the system, method, and program product determines, using the computed conjoint probabilities, discrimination factors that have a highest calculated conjoint probability of appearing together in the subset of records.

In another embodiment, the system, method, and program product includes subsequent user provided attributes such as a demographic attribute, a non-demographic attribute, a biographical attribute, a descriptive attribute, a condition attribute, a state attribute, a transactional attribute, a geospatial attribute, and a temporal attribute. In one embodiment, the system, method, and program product includes discrimination factors such as a probability factor, an expert rules factor, or a policy factor, that correspond to the subset discriminating requests.

In another embodiment, the system, method, and program product includes an explicit matched record, an irreducible record set, an under threshold set, or an over limit response as the reduction completion result. In one embodiment, the system, method, and program product determines that the subset of records is the reduction completion result by using only the initial user provided attribute.

In another embodiment, the system, method, and program product determines that the subset of records includes a non-compliant amount of records compared with a maximum record set limit. In this embodiment, the system, method, and program product provides an over limit response to the user, which includes zero records.

In another embodiment, the system, method, and program product determines that the subset of records includes an amount of records that are less than an allowable threshold value. In this embodiment, the system, method, and program product provides the records, which are an under threshold set, to the user.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 2 is a diagram showing a record table that includes a plurality of records;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
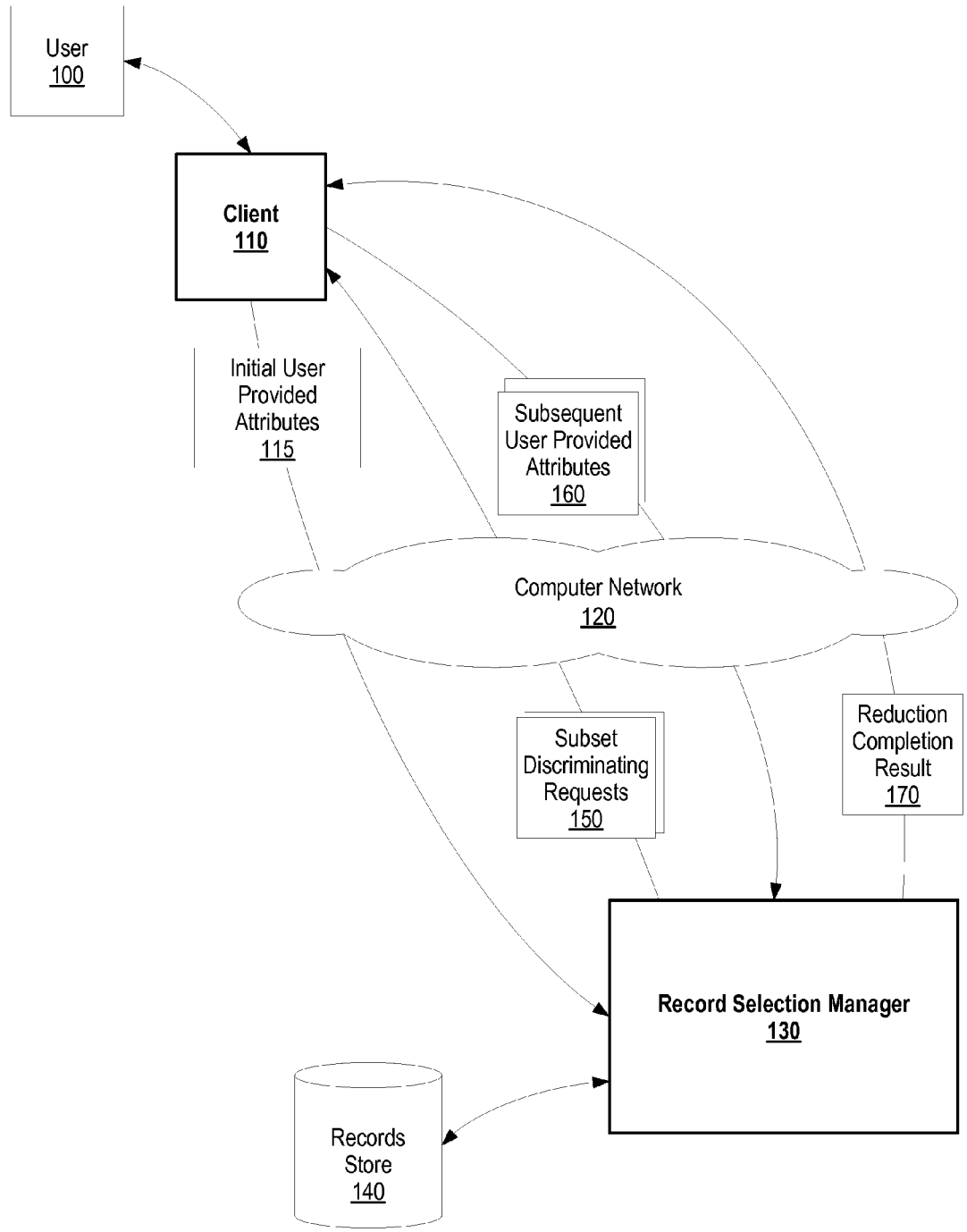
FIG. 1 is a diagram showing a record selection manager providing a reduction completion result to a user, which is based upon initial user provided attributes and subsequent user provided attributes.

FIG. 1 is a diagram showing a record selection manager providing a reduction completion result to a user based upon received user provided attributes. User 100 wishes to view a record (e.g., medical history) that is located in records store 140. In order to prevent user 100 from viewing records other than specific records in which user 100 is interested, record selection manager 130 iteratively requests attribute information from user 100 to disambiguate which records to provide. Records store 140 may be stored on a nonvolatile storage area, such as a computer hard drive.

User 100 uses client 110 to send initial user provided attributes 115 to record selection manager 130 through computer network 120, such as the Internet. Initial user provided attributes 115 includes one or more attributes (e.g., a person's name) corresponding to the record which user 100 wishes to view. Record selection manager 130 identifies a subset of records included in records store 140 that each includes a record attribute value that matches initial user provided attributes 115. For example, if initial user provided attributes 115 includes the name "Pat Smith," record selection manager 130 identifies those records included in records store 140 that includes a record attribute value of "Pat Smith."

Figure 6:
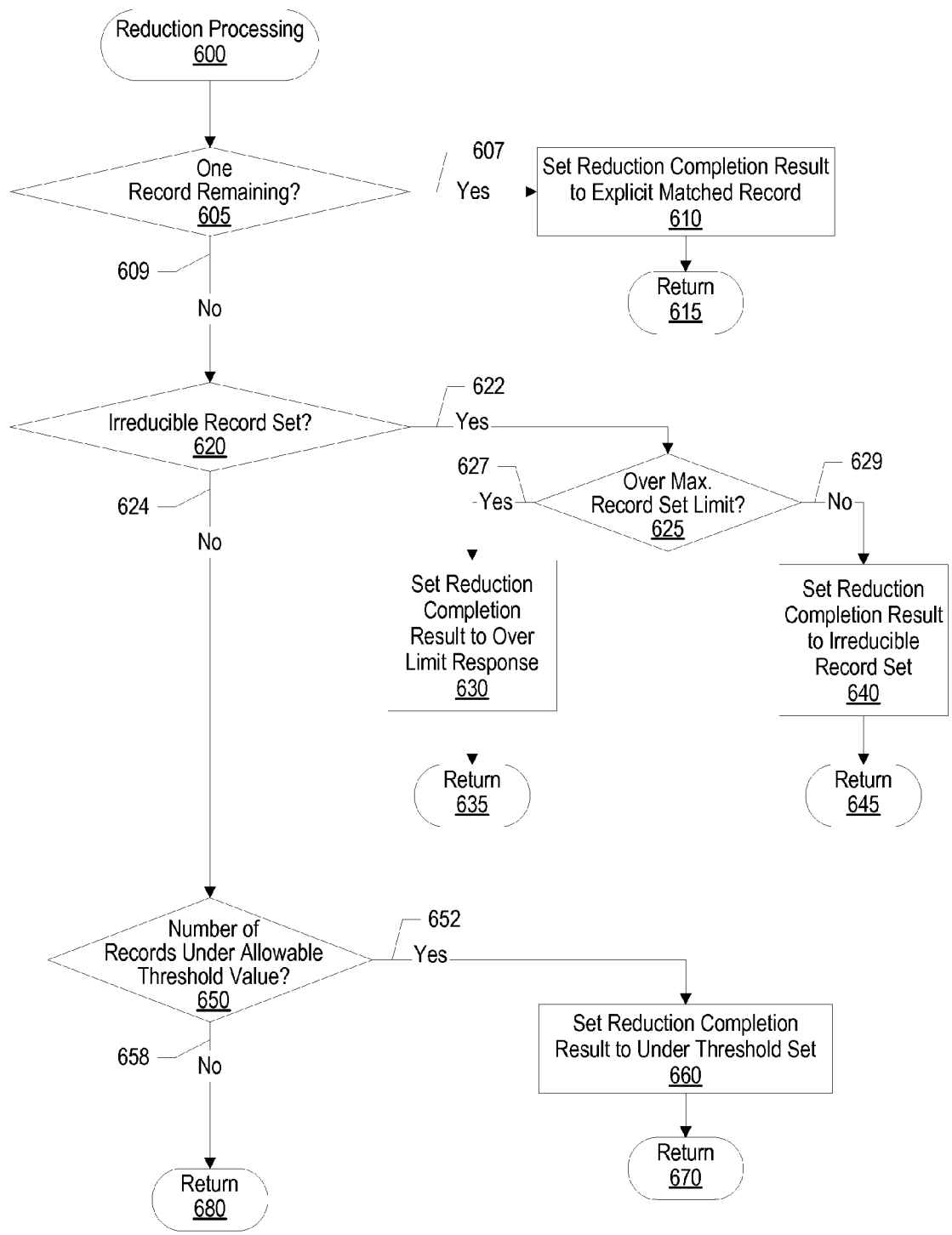
FIG. 6 is a detail level flowchart showing steps taken in identifying whether the subset of records is a reduction completion result.

Record selection manager 130 analyzes the subset of records and determines 1) whether any records include record attribute values that match initial user provided attributes 115, 2) whether further record refinement is required, or 3) whether the subset of records is a "reduction completion result." A reduction completion result may include an "explicit matched record," an "irreducible record set," an "over threshold set," or an "over limit response" (see FIG. 6 and corresponding text for further details).

When no records match, record selection manager 130 sends a "no records match" message to user 100. When further record refinement is required, record selection manager 130 uses conjoint probability calculations in order to identify "subset discriminating requests" that, when known, minimize the number of records included in the subset of records. For example, if ten "Pat Smith" records are included in the subset of records, five of which live in Texas and five of which live in California, record selection manager 130 may determine that by user 100 providing which state the person resides, that the number of records included in the subset of records may be reduced in half (see FIG. 5 and corresponding text for further details).

When further record refinement is required, record selection manager 130 sends subset discriminating requests 150 to user 100's client 110 through computer network 120. In turn, user 100 provides subsequent user provided attributes 160 to record selection manager 130. In one embodiment, subset discriminating requests 150 may include a choice as to which attributes to provide, such as "Please provide Pat Smith's year of birth or City." In this embodiment, subsequent user provided attributes 160 may include one of the requested attributes (e.g., Pat Smith's year of birth).

Subsequent user provided attributes 160 may include, for example, a demographic attribute (e.g., nationality), a non-demographic attribute (e.g., diabetic), a biographical attribute (e.g., proper name), a descriptive attribute (e.g., large), a condition attribute (e.g., possible weapon), a state attribute (e.g., criminal), a transactional attribute (e.g., $125), a geo-spatial attribute (e.g., Corner of Charlston/Weber, or lattitude/longitude), or a temporal attribute (e.g., Dec. 3, 2007).

Record selection manager 130 matches subsequent user provided attributes 160 against the subset of records, and determines whether no records match or whether the remaining records are a reduction completion result, which may be an "explicit matched record," an "irreducible record set," an "over threshold set," or an "over limit response." An explicit matched record results when the subset of records includes only one record that includes record attribute value(s) that match the user provided attributes (initial/subsequent). An irreducible record set results when the subset of records comprises a plurality of records that each includes record attribute value(s) that match the user provided attributes (initial/subsequent), and where the subset of records is not further reducible using additional subsequent user provided attributes. For example, record A may include "Customer 123, Mark Smith, Born 1976", and record B may include "Customer 345, Mark R. Smith, Born Mar. 12, 1976."

An under threshold set results when a subset of records, although possibly further reducible with more subsequent user provided attributes, includes an amount of records that is less than or equal to an allowable threshold value, such as a policy that the subset of records must be less than five records. For example, if a database includes 1,000 records and, after user 100 provided initial user provided attributes 115 and subsequent user provided attributes 160, record selection manager 130 reduced the subset of records to four records, record selection manager 130 returns each of the four records to user 100. An over limit response results when the subset of records is a non-compliant amount, such as over a maximum record set limit. When an over limit response occurs, record selection manager 130 returns zero records.

When record selection manager 130 determines that the subset of records is a reduction completion result, record selection manager 130 sends reduction completion result 170 to user 100. On the other hand, when the subset of records does not include a reduction completion result, record selection manager 130 once again sends more subset discriminating requests 150 to user 100. In turn, record selection manager 130 receives additional subsequent user provided attributes 160 to reduce the number of records included in the subset of records. When record selection manager 130 reduces the subset of records to a reduction completion result or no record match, record selection manager 130 provides reduction completion result 170, or a no record match response, to user 100.

Using the invention described herein, record selection manager 130 conceals the records included in records store 140 until it identifies reduction completion result 170, in which case record selection manager 130 only provides reduction completion result 170 to user 100 to view.

FIG. 2 is a diagram showing a record table that includes a plurality of records. Table 200 includes records 250-270, in which each record includes a number of record attributes (columns 205-240). Depending upon initial and subsequent user provided attributes that a record selection manager receives from a user, the record selection manager selects a reduction completion result from records 250-270 and provides the reduction completion result to the user. The reduction completion result may be an explicit matched record, an irreducible record set, an under threshold set, or an over limit response.

As can be seen in the example shown in FIG. 2, table 200 includes three records with the same "Name" record attribute of "Pat Smith" (records 255-265). Two of these records also have the same "State" record attribute of "VT" (records 255-260). As such, in order for the record selection manager to select a reduction completion result for Pat Smith, the record selection manager requires from the user either a City, a Zip code, a year of birth, a social security number, or a deductible amount (see FIG. 3 and corresponding text for further details).

Figure 3:
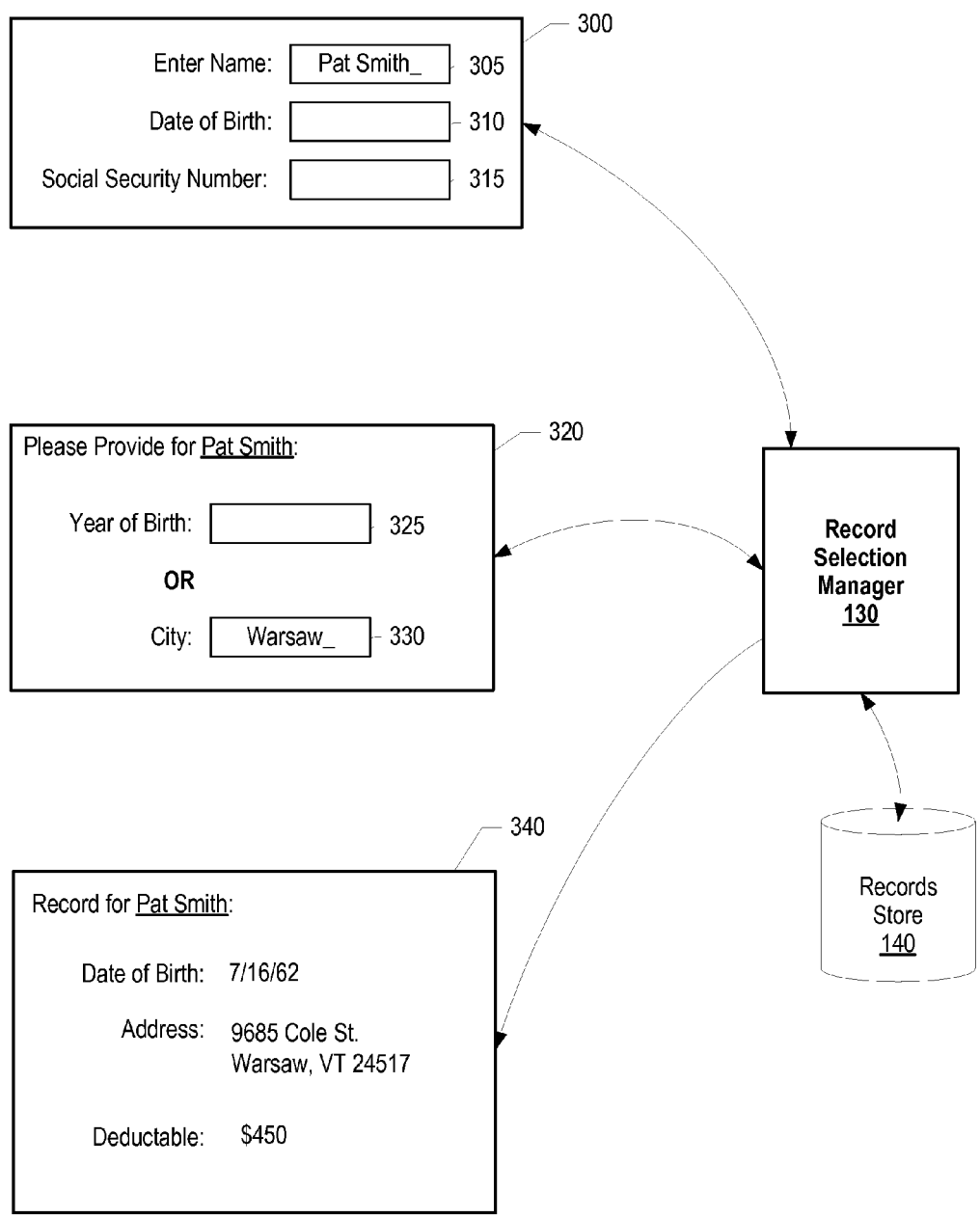
FIG. 3 is a diagram showing a record selection manager interfacing with a user's client to iteratively identify and provide a reduction completion result.

FIG. 3 is a diagram showing a record selection manager interfacing with a user's client to iteratively identify and provide a reduction completion result. Records selection manager 130 receives user provided attributes in order to select a reduction completion result from a plurality of records included in records store 140. Record selection manager 130 and records store 140 are the same as that shown in FIG. 1.

A user's client, such as client 110 shown in FIG. 1, displays user interface window 300 to the user in order for the user to initiate the process of viewing a particular person's record. Depending upon the user's knowledge of the person's information, the user enters initial user provided attributes about a record in which the user wishes to view in fields 305-315. FIG. 3 shows that the user enters "Pat Smith" in field 305 and leaves fields 310-315 empty.

Records selection manager 130 receives initial user provided attribute "Pat Smith" and identifies a subset of records that include record attribute values that match "Pat Smith." In turn, record selection manager 130 sends a subset discriminating request to the user, which is displayed on the client in user interface window 320. The example shown in FIG. 3 allows the user to enter the person's "Year of Birth" in field 325 or the person's "City" in field 330. As can be seen, the user entered the person's city in field 330, which is sent to record selection manager 130.

Record selection manager 130 reduces the subset of records using the city "Warsaw," and determines that one record remains in the subset of records. As a result, the one remaining record is the reduction completion result, which is provided to the user in user interface window 340.

Figure 4:
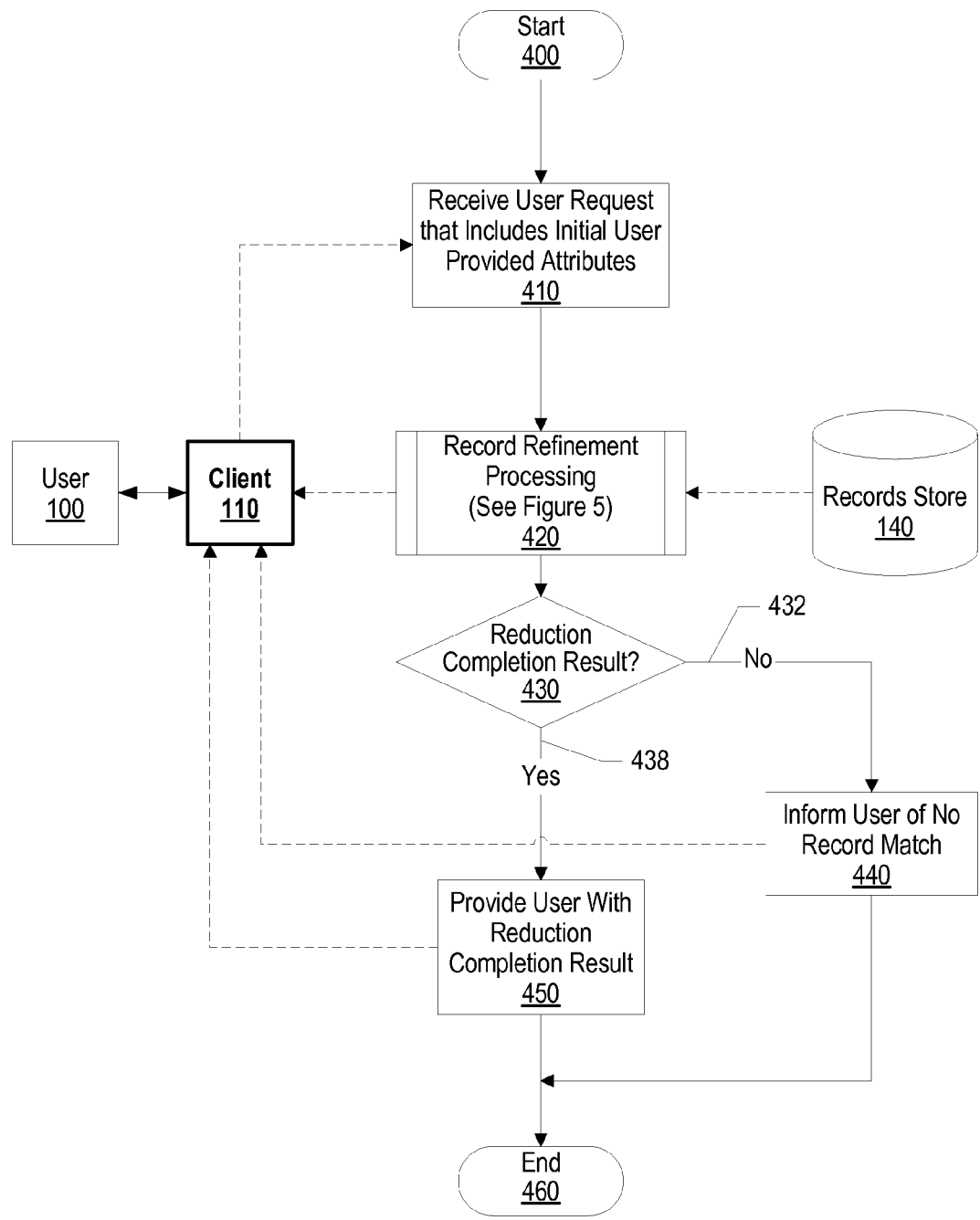
FIG. 4 is a high-level flowchart showing steps taken in selecting a reduction completion result from a plurality of records.

FIG. 4 is a high-level flowchart showing steps taken in selecting a reduction completion result from a plurality of records. A records selection manager identifies, and iteratively reduces, a subset of records using initial user provided attributes and subsequent user provided attributes. Once the subset of records reduces to a reduction completion result or no matched records, the record selection manager provides the reduction completion result to the user.

Processing commences at 400, whereupon processing receives a request from user 100 through client 110 at step 410. The request includes an initial user provided attribute, such as a person's name or address. In one embodiment, the request may include more than one attribute, such as a person's name and phone number. User 100 and client 110 are the same as that shown in FIG. 1.

Figure 5:
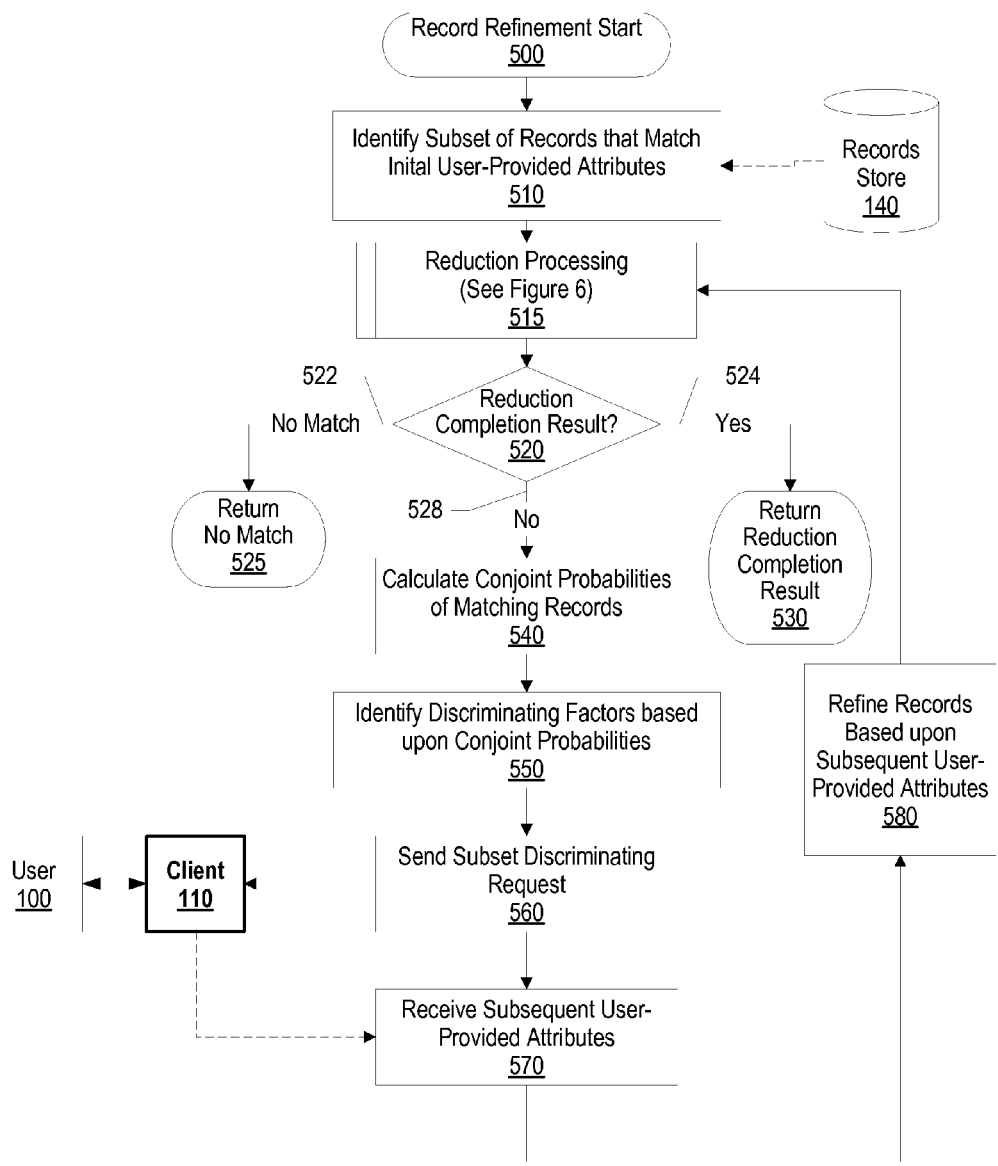
FIG. 5 is a detail level flowchart showing steps taken in selecting a reduction completion result based upon subsequent user provided attributes.

Processing identifies a subset of records from a plurality of records included in records store 140, and proceeds through an iteration process that queries user 100 for subsequent user provided attributes in order to reduce the subset of records to either a reduction completion result or no matched records (pre-defined process block 420, see FIG. 5 and corresponding text for further details). Records store 140 is the same as that shown in FIG. 1.

A determination is made as to whether the iteration process resulted in a reduction completion result or no matched record (decision 430). A reduction completion result may include an explicit matched record, an irreducible record set, an under threshold set, or an over limit response. If the iteration process resulted in a reduction completion result, decision 430 branches to "Yes" branch 438 whereupon processing provides user 100 with the reduction completion result at step 450, and processing ends at 460. Up to this point, processing has concealed each of the plurality of records from user 100.

On the other hand, if the iteration process resulted in no matched record, decision 430 branches to "No" branch 432 whereupon processing informs user 100 that no records matched user 100's user provided attributes, and processing ends at 460.

FIG. 5 is a detail level flowchart showing steps taken in selecting a reduction completion result based upon user provided attributes. A records selection manager receives a request from user 100 that includes initial user provided attributes. For example, user 100 may wish to view a record for "Pat Smith" and, in this example, user 100's request includes the name "Pat Smith" as the initial user provided attributes (see FIG. 4 and corresponding text for further details). Once processing receives the initial request, processing proceeds through a series of steps in order to identify and select a reduction completion result from a plurality of records.

Processing commences at 500, whereupon processing identifies a subset of records from records store 140 that include record attribute values that match the initial user provided attributes (step 510). Using the example described above, processing identifies each record that includes "Pat Smith" as a name record attribute value. Processing proceeds through a series of steps to determine whether the subset of records is at a record completion result (pre-defined process block 515, see FIG. 5 and corresponding text for further details). A record completion result may include an explicit matched record, an irreducible record set, an under threshold set, or an over limit response. For example, if processing is configured with an allowable threshold value of less than five records, processing checks whether the subset of records is less than five records at this decision and, if so, determines that the subset of records is an under threshold set. In another example, if processing has proceeded through a number of iteration steps and is no longer able to refine the subset of records, yet the number of records remaining in the subset of records is over a record set limit, processing determines that the subset of records results in at an over limit response and returns zero records.

A determination is made as to whether the subset of records 1) includes any records, 2) requires further refinement, or 3) is a reduction completion result (decision 520). If no records exist in the subset of records, decision 520 branches to "No Match" branch 522 whereupon processing returns a "No Match" at 525. On the other hand, if the subset of records is a reduction completion result, processing branches to "Yes" branch 524 whereupon processing returns a "reduction completion result" at 530.

When the subset of records requires further refinement, decision 520 branches to "No" branch 528 to begin an iterative process of reducing the subset of records to a result of either a reduction completion result or no record match. At step 540, processing calculates conjoint probabilities of the subset of records. Conjoint probability calculations are known to those skilled in the art, such as by using an a-priori algorithm. Conjoint probability calculations provide subsets of entities within an overall set of potential entities based on higher (or lower) conjoint probabilities than would be otherwise expected from the calculation of distributions independently. For example, 50% of records may indicate GENDER=MALE and 50% may indicate EYECOLOR=BROWN, leading to an expected calculation that 25% should have GENDER=MALE & EYECOLOR=BROWN. Deviations from this expected value may be pre-calculated for a set of all entities, and those sets that have the lowest values (e.g. only 5% of all records are males with brown eyes) may be utilized to provide the selection criteria. This technique may also be performed on individual set elements when background population statistics are known (e.g. 60% of all people are female or 70% of all people have brown eyes).

Processing uses the results of the conjoint probability calculations to identify discriminating factors, which may include a probability factor (e.g., statistically motivated to request a specified attribute), an expert rules factor (e.g., always ask for year of birth over month of birth), a policy factor (e.g., pursuant to company policy, only the last four digits of the SSN), or other factors that discriminate one record over another record. For example, if ten records include the name "Pat Smith," five of which live in Texas and five of which live in California, processing may identify that by user 100 providing which state the person resides, the number of records included in the subset of records may be reduced in half.

Processing, at step 560, sends a subset discriminating request to user 100 through client 110. The subset discriminating request includes a request for attributes corresponding to the discriminating factors that were identified back in step 550. User 100 reviews the subset discriminating request, and responds by providing one or more subsequent user provided attributes, which are received at step 570.

Processing reduces the subset of records based upon the subsequent user provided attributes at step 580. Using the example described above, if user 100 specified that Pat Smith resides in Texas, processing reduces the subset of records to five records. Processing loops back to proceed through a series of steps to determine whether the subset of records is at a record completion result (pre-defined process block 515). This looping continues until the subset of records includes no records or is a reduction completion result, in which case decision 520 branches to "No" branch 522 or "Yes" branch 524, respectively.

FIG. 6 is a detail level flowchart showing steps taken in identifying whether the subset of records is a reduction completion result. Processing commences at 600, whereupon a determination is made as to whether only one record remains in the subset of records (decision 605). If the subset of records includes only record, decision 605 branches to "Yes" branch 607 whereupon processing identifies the reduction completion result as an explicit matched record (step 610), and returns at 615. On the other hand, if the subset of records includes more than one record, decision 605 branches to "No" branch 609.

A determination is made as to whether the subset of records is an irreducible record set (decision 620). An irreducible record set is a subset of records that is no longer reducible with additional subsequent user provided attributes. If the subset of records is an irreducible record set, decision 620 branches to "Yes" branch 622 whereupon a determination is made as to whether the number of records included in the subset of records is over a maximum record set limit, such as ten records (decision 625). If the number of records included in the subset of records is over the maximum record set limit, decision 625 branches to "Yes" branch 627 whereupon processing identifies the reduction completion result as an over limit response (step 630), in which case zero records will be returned to the user. Processing returns at 635.

On the other hand, if the number of records included in the subset of records is less than a maximum record set limit, decision 625 branches to "No" branch 629 whereupon processing identifies the reduction completion result as an irreducible record set (step 640), and processing returns at 645.

If the subset of records is not an irreducible record set, decision 620 branches to "No" branch 624 whereupon a determination is made as to whether the number of records included in the subset of records is under an allowable threshold value (decision 650). If the number of records is under an allowable threshold value, decision 650 branches to "Yes" branch 652 whereupon processing identifies the reduction completion result as an under threshold set (step 660), and processing returns at 670.

On the other hand, if the number of records included in the subset of records is not an under threshold set, decision 650 branches to "No" branch 658 whereupon processing returns at 680 to further reduce the subset of records.

Figure 7:
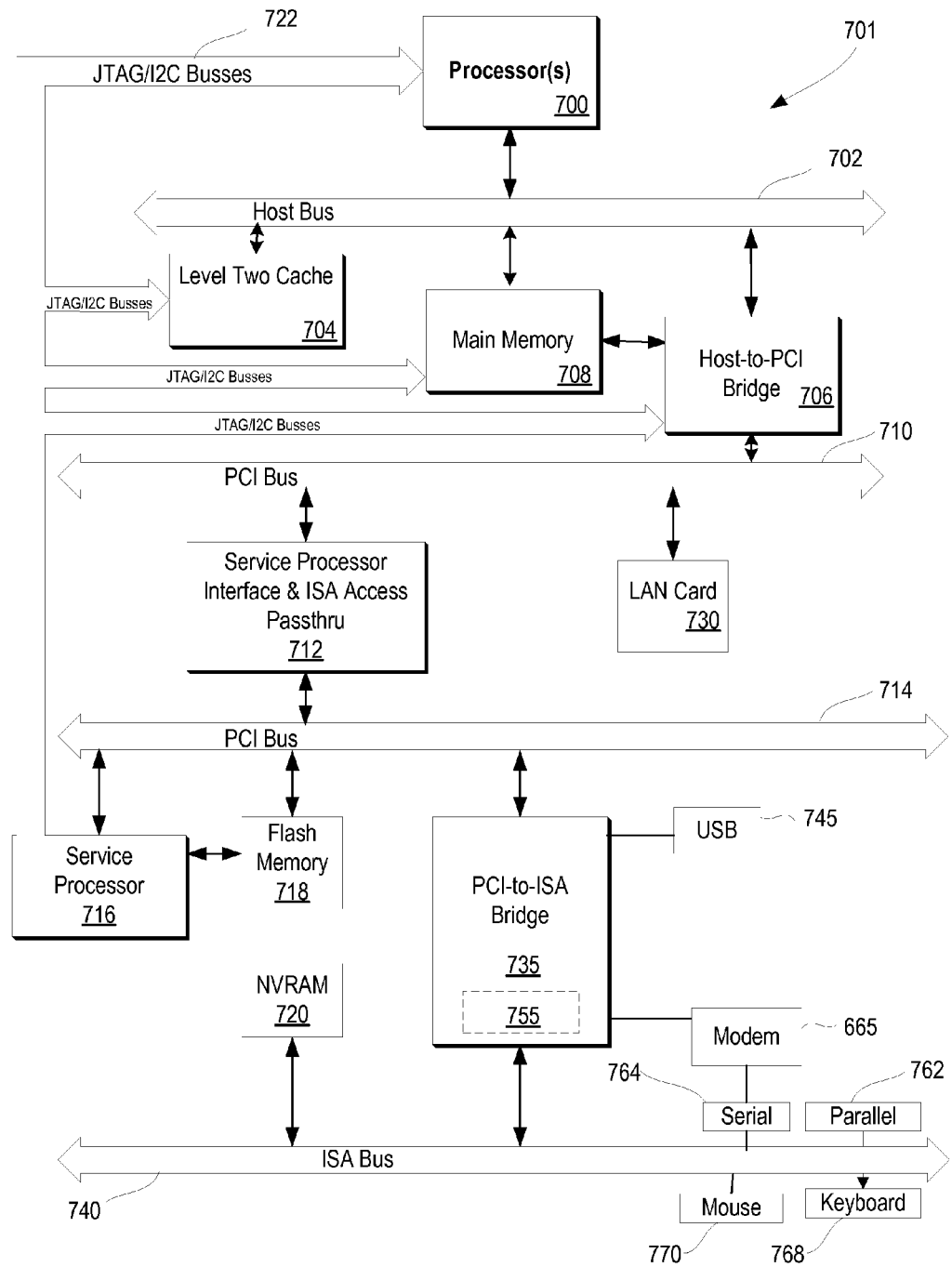
FIG. 7 is a block diagram of a computing device capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 765 is connected to serial port 764 and PCI-to-ISA Bridge 735.

While FIG. 7 shows one information handling system that employs processor(s) 700, the information handling system may take many forms. For example, information handling system 701 may take the form of a desktop, server, portable, laptop, notebook, or other form factor computer or data processing system. Information handling system 701 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    receiving a request from a user that includes an initial user provided attribute;
    identifying a subset of records from a plurality of records using the initial user provided attribute, the subset of records including more than one of the plurality of records and each of the subset of records including a first record attribute value that matches the initial user provided attribute;
    preventing the user from viewing any portion of the subset of records during steps of:
        analyzing the subset of records in order to detect record attribute differences between records included in the subset of records;
        identifying one or more discrimination factors in response to the analysis that discriminates one or more of the records over another one or more of the records;
        in response to the identifying of the one or more discrimination factors, sending a subset discriminating request, without a subsequent user provided attribute, to the user that requests the user to provide the subsequent user provided attribute that corresponds to the one or more discrimination factors;
        receiving the subsequent user provided attribute from the user in response to the sending of the subset discriminating request;
        reducing, in response to receiving the subsequent user provided attribute, the subset of records to a reduction completion result utilizing the subsequent user provided attribute, the reduction completion result including one or more records that each include a second record attribute value that matches the subsequent user provided attribute; and
    providing the reduction completion result to the user, wherein the providing includes preventing the user from viewing each of the subset of records other than those in the reduction completion result.

2. The method of claim 1 wherein the reduction completion result is only one record from the subset of records, the one record being an explicit matched record.

3. The method of claim 1 wherein the reduction completion result is an irreducible record set that comprises a reduced subset of records, each of the reduced subset of records including record attribute values such that the reduced subset of records is not further reducible using additional subsequent user provided attributes.

4. The method of claim 1 further comprising:
    computing conjoint probabilities among record attributes using their corresponding record attribute values; and
    determining, based upon the computing of the conjoint probabilities, the one or more discrimination factors that have the highest calculated conjoint probabilities of appearing together in the subset of records.

5. The method of claim 1 wherein the subsequent user provided attributes are selected from the group consisting of a demographic attribute, a non-demographic attribute, a biographical attribute, a descriptive attribute, a condition attribute, a state attribute, a transactional attribute, a geospatial attribute, and a temporal attribute.

6. The method of claim 1 wherein the one or more discrimination factors are selected from the group consisting of a probability factor and an expert rules factor, wherein the probability factor is based upon statistical analysis of the subset of records and wherein the expert rules factor is based upon always requesting one type of attribute over a different type of attribute.

7. The method of claim 1 wherein the reduction completion result is selected from the group consisting of an explicit matched record, an irreducible record set, an under threshold set, and an over limit response.

8. The method of claim 1 further comprising:
    determining that the subset of records is the reduction completion result by only using the initial user provided attribute; and
    performing the providing in response to determining that the subset of records is the reduction completion result by only using the initial user provided attribute.

9. The method of claim 1 further comprising:
determining that the reducing results in a non-compliant amount of records based upon a maximum record set limit, resulting in the reduction completion result being an over limit response; and
providing zero records to the user in response to the determining of the over limit response.

10. The method of claim 1 further comprising:
determining that the reducing results in an amount of records that are less than an allowable threshold value, resulting in the reduction completion result being an under threshold set; and
providing the records included in the under threshold set to the user in response to the determining of the under threshold set.

11. A computer program product stored in a tangible computer storage medium, comprising functional descriptive material that, when executed by an information handling system, causes the information handling system to perform actions that include:
receiving a request from a user that includes an initial user provided attribute;
identifying a subset of records from a plurality of records using the initial user provided attribute, the subset of records including more than one of the plurality of records and each of the subset of records including a first record attribute value that matches the initial user provided attribute;
preventing the user from viewing any portion of the subset of records during steps of:
analyzing the subset of records in order to detect record attribute differences between records included in the subset of records;
identifying one or more discrimination factors in response to the analysis that discriminates one or more of the records over another one or more of the records;
in response to the identifying of the one or more discrimination factors, sending a subset discriminating request, without a subseguent user provided attribute, to the user that requests the user to provide the subsequent user provided attribute that corresponds to the one or more discrimination factors;
receiving the subsequent user provided attribute from the user in response to the sending of the subset discriminating request;
reducing, in response to receiving the subsequent user provided attribute, the subset of records to a reduction completion result utilizing the subsequent user provided attribute, the reduction completion result including one or more records that each include a second record attribute value that matches the subsequent user provided attribute; and
providing the reduction completion result to the user, wherein the providing includes preventing the user from viewing each of the subset of records other than those in the reduction completion result.

12. The computer program product of claim 11 wherein the reduction completion result is only one record from the subset of records, the one record being an explicit matched record.

13. The computer program product of claim 11 wherein the reduction completion result is an irreducible record set that comprises a reduced subset of records, each of the reduced subset of records including record attribute values such that the reduced subset of records is not further reducible using additional subsequent user provided attributes.

14. The computer program product of claim 1 wherein the information handling system further performs actions that include:
computing conjoint probabilities among record attributes using their corresponding record attribute values; and
determining, based upon the computing of the conjoint probabilities, the one or more discrimination factors that have the highest calculated conjoint probabilities of appearing together in the subset of records.

15. The computer program product of claim 11 wherein the subsequent user provided attributes are selected from the group consisting of a demographic attribute, a non-demographic attribute, a biographical attribute, a descriptive attribute, a condition attribute, a state attribute, a transactional attribute, a geo-spatial attribute, and a temporal attribute.

16. The computer program product of claim 11 wherein the one or more discrimination factors are selected from the group consisting of a probability factor and an expert rules factor, wherein the probability factor is based upon statistical analysis of the subset of records and wherein the expert rules factor is based upon always requesting one type of attribute over a different type of attribute.

17. The computer program product of claim 11 wherein the reduction completion result is selected from the group consisting of an explicit matched record, an irreducible record set, an under threshold set, and an over limit response.

18. The computer program product of claim 11 wherein the information handling system further performs actions that include:
determining that the subset of records is the reduction completion result by only using the initial user provided attribute; and
performing the providing in response to determining that the subset of records is the reduction completion result by only using the initial user provided attribute.

19. The computer program product of claim 11 wherein the information handling system further performs actions that include:
determining that the reducing results in a non-compliant amount of records based upon a maximum record set limit, resulting in the reduction completion result being an over limit response; and
providing zero records to the user in response to the determining of the over limit response.

20. The computer program product of claim 11 wherein the information handling system further performs actions that include:
determining that the reducing results in an amount of records that are less than an allowable threshold value, resulting in the reduction completion result being an under threshold set; and
providing the records included in the under threshold set to the user in response to the determining of the under threshold set.

21. An information handling system comprising:
one or more processors;
a memory accessible by at least one of the processors;
a nonvolatile storage area accessible by at least one of the processors;
a set of instructions stored in the memory and executed by at least one of the processors in order to perform actions of:
receiving a request from a user that includes an initial user provided attribute;
identifying a subset of records from a plurality of records using the initial user provided attribute, the subset of records including more than one of the plurality of records and each of the subset of records including a first record attribute value that matches the initial user provided attribute;

preventing the user from viewing any portion of the subset of records during steps of:

analyzing the subset of records in order to detect record attribute differences between records included in the subset of records;

identifying one or more discrimination factors in response to the analysis that discriminates one or more of the records over another one or more of the records;

in response to the identifying of the one or more discrimination factors, sending a subset discriminating request, without a subsequent user provided attribute, to the user that requests the user to provide the subsequent user provided attribute that corresponds to the one or more discrimination factors;

receiving the subsequent user provided attribute from the user in response to the sending of the subset discriminating request;

reducing, in response to receiving the subsequent user provided attribute, the subset of records to a reduction completion result utilizing the subsequent user provided attribute, the reduction completion result including one or more records that each include a second record attribute value that matches the subsequent user provided attribute; and providing the reduction completion result to the user, wherein the providing includes preventing the user from viewing each of the subset of records other than those in the reduction completion result.

22. The information handling system of claim 21 wherein the reduction completion result is only one record from the subset of records, the one record being an explicit matched record.

23. The information handling system of claim 21 wherein the reduction completion result is an irreducible record set that comprises a reduced subset of records, each of the reduced subset of records including record attribute values such that the reduced subset of records is not further reducible using additional subsequent user provided attributes.

24. The information handling system of claim 21 wherein the information handling system further performs actions that include:

computing conjoint probabilities among record attributes using their corresponding record attribute values; and determining, based upon the computing of the conjoint probabilities, the one or more discrimination factors that have the highest calculated conjoint probabilities of appearing together in the subset of records.

25. The information handling system of claim 21 wherein the subsequent user provided attributes are selected from the group consisting of a demographic attribute, a non-demographic attribute, a biographical attribute, a descriptive attribute, a condition attribute, a state attribute, a transactional attribute, a geo-spatial attribute, and a temporal attribute.

26. The information handling system of claim 21 wherein the one or more discrimination factors are selected from the group consisting of a probability factor and an expert rules factor, wherein the probability factor is based upon statistical analysis of the subset of records and wherein the expert rules factor is based upon always requesting one type of attribute over a different type of attribute.

27. The information handling system of claim 21 wherein the reduction completion result is selected from the group consisting of an explicit matched record, an irreducible record set, an under threshold set, and an over limit response.

28. The information handling system of claim 21 wherein the information handling system further performs actions that include:

determining that the subset of records is the reduction completion result by only using the initial user provided attribute; and performing the providing in response to determining that the subset of records is the reduction completion result by only using the initial user provided attribute.

29. The information handling system of claim 21 wherein the information handling system further performs actions that include:

determining that the reducing results in a non-compliant amount of records based upon a maximum record set limit, resulting in the reduction completion result being an over limit response; and providing zero records to the user in response to the determining of the over limit response.

30. The information handling system of claim 21 wherein the information handling system further performs actions that include:

determining that the reducing results in an amount of records that are less than an allowable threshold value, resulting in the reduction completion result being an under threshold set; and providing the records included in the under threshold set to the user in response to the determining of the under threshold set.

* * * * *